United States Patent [19]

Koyanagi et al.

[11] Patent Number: 5,940,040
[45] Date of Patent: Aug. 17, 1999

[54] SYSTEM FOR SELECTING BETWEEN A WHIP ANTENNA AND A BUILT-IN ANTENNA

[75] Inventors: Yoshio Koyanagi; Tsukasa Takahashi, both of Kanagawa, Japan

[73] Assignee: Matsushita Electric Industrial Co., Ltd., Osaka, Japan

[21] Appl. No.: 08/910,740

[22] Filed: Aug. 13, 1997

[30] Foreign Application Priority Data

Aug. 30, 1996 [JP] Japan ................................. 8-230935

[51] Int. Cl.⁶ ................................................. H01Q 1/24
[52] U.S. Cl. ......................... 343/702; 343/860; 455/277.1
[58] Field of Search ................................. 343/702, 725, 343/700 MS, 860; 455/78, 277.1

[56] References Cited

U.S. PATENT DOCUMENTS

| | | | |
|---|---|---|---|
| 4,633,519 | 12/1986 | Gotoh et al. | 455/277 |
| 4,803,447 | 2/1989 | Schultz et al. | 333/103 |
| 4,914,714 | 4/1990 | Tamura | 455/78 |
| 4,958,382 | 9/1990 | Imanishi | 343/702 |
| 5,493,311 | 2/1996 | Itoh et al. | 343/860 |
| 5,659,886 | 8/1997 | Taira et al. | 455/81 |
| 5,734,355 | 3/1998 | Watanabe | 343/860 |

FOREIGN PATENT DOCUMENTS 0 210 746 A2  2/1987  European Pat. Off. .
0 680 161 A1  11/1995  European Pat. Off. .

*Primary Examiner*—Don Wong
*Assistant Examiner*—Tan Ho
*Attorney, Agent, or Firm*—Pearne, Gordon McCoy & Granger LLP

[57] ABSTRACT

An antenna system comprises:

a whip antenna and a built-in antenna for diversity reception;

an antenna select switch for selecting one of the antennas and connecting the selected one to a radio circuit; and a transmission line length adjusting circuit, inserted between the antenna select switch and the whip antenna, for controlling a terminal load condition of the whip antenna, when the built-in antenna is connected to the radio circuit.

2 Claims, 7 Drawing Sheets

32: HOUSING OF WIRELESS MACHINE

SYSTEM FOR SELECTING BETWEEN A WHIP ANTENNA AND A BUILT-IN ANTENNA

BACKGROUND OF THE INVENTION

The present invention relates to an antenna system of the diversity reception type, used mainly for a mobile wireless machine.

During recent years, a mobile radio communication market has expanded. With this, market needs for mobile wireless machines, in particular small and high performance mobile wireless machines, such as handyphones and PHS (personal handyphone system), are rapidly increasing. A PDC (personal digital cellular) system having frequency bands of 800 MHz and 1.5 GHz, is widely used in the current handyphone system in Japan. A whip antenna, retractable into the machine body, and another antenna, built in the machine body and used for diversity reception, are assembled into a handyphone, and one of these antennas is selected when the handyphone is operated for use.

Figure 8:
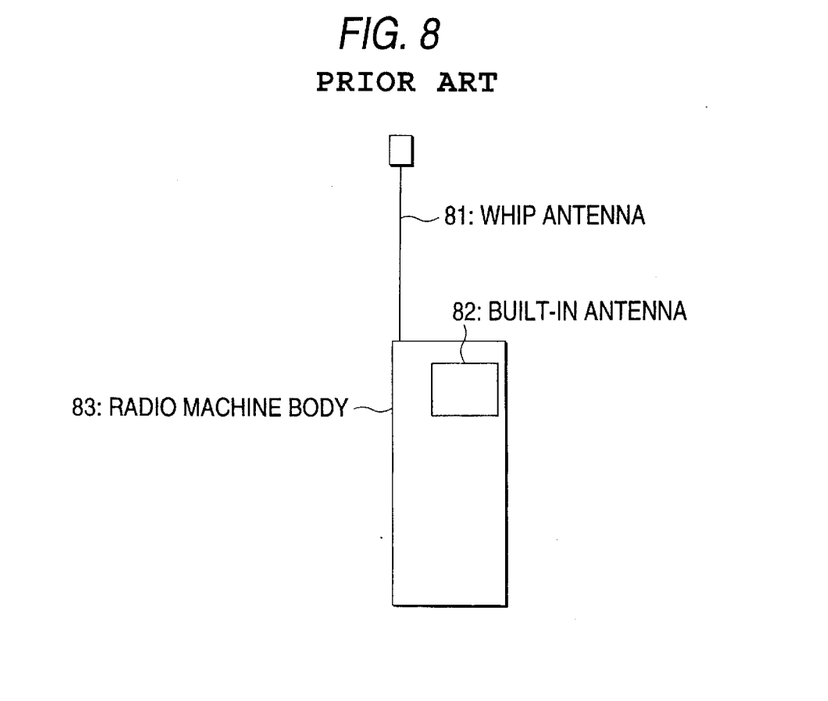
FIG. 8 is a diagram schematically showing a parts layout of an antenna system in a conventional small wireless radio machine.

FIG. 8 schematically shows a parts-layout of an antenna system in a conventional small wireless machine. In the figure, reference numeral 81 is a whip antenna and 82 is a built-in antenna. The whip antenna 81 is used as a transmission/reception antenna retractable into a radio machine body 83. The built-in antenna 82 is a sub-antenna for diversity reception, used only for the reception purpose. Of the two antennas, one antenna put in a higher receiving electric field than the other is selected by a select switch of the machine body, whereby to effect a diversity reception.

Figure 9:
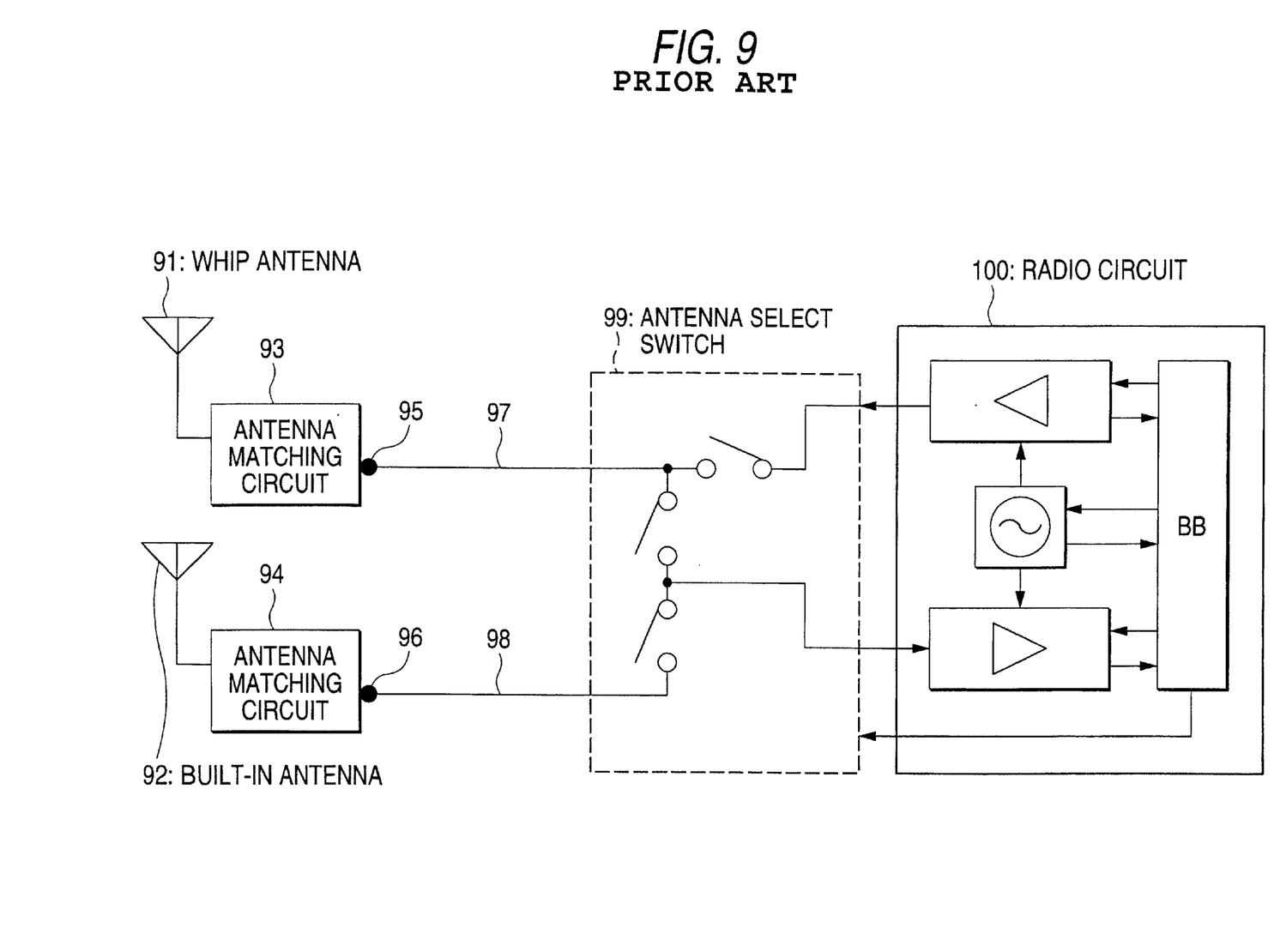
FIG. 9 is a circuit diagram showing a conventional antenna system.

FIG. 9 is a circuit diagram showing a conventional antenna system of a small wireless machine. In the figure, numeral 91 is a whip antenna and 92 is a built-in antenna. Numeral 93 is an antenna matching circuit connected to the whip antenna 91, and 94 is an antenna matching circuit of the built-in antenna 92. The antenna matching circuits 93 and 94 are respectively connected at their nodes 95 and 96 to feeders 97 and 98, which are then connected to an antenna select switch 99. Of the two antennas 91 and 92, the antenna put in a higher receiving electric field than the other is selected by the antenna select switch 99, and connected to a radio circuit 100, to thereby realize a quality and stable mobile communication.

With a size reduction of the mobile wireless machine, the antennas is also reduced in size and further the two antennas are disposed more closely. Where the antennas are closely disposed, the whip antenna and/or the built-in antenna are reduced in their receiving sensitivity, so that a communication quality is degraded. Particularly in the diversity system shown in FIG. 9 in which only the antennas are switched one to the other for diversity reception, when the built-in antenna 92 is selected, the terminal condition of the whip antenna 91 is open in the antenna select switch 99 since it is not connected to the radio circuit 100. Such does not take place in a post-detection diversity system in which receiving circuits are provided in association with a main antenna and a sub-antenna, respectively. Actually, the feeder 97, for example, exists between the whip antenna 91 and the antenna select switch 99, so that the whip antenna and the select switch are spaced from each other a given distance. An impedance looking toward the radio circuit 100 from the node 95 of the antenna matching circuit 93 is zero (0Ω) or the transmission line extending from the node to the radio circuit is open at the end when an electrical distance of the transmission line is ¼ wavelength. When the electrical length of the transmission line is ½ wavelength, the transmission line is open at the end or the impedance of the transmission line is infinity (∞Ω). When the electrical distance of the transmission line is between ¼ to ½ wavelength, the impedance of the transmission line is between 0Ω to ∞Ω. Thus, the impedance varies when the distance of the transmission line varies, or it is instable. The coupling of the whip antenna 91 and the built-in antenna 92 depends largely on the mutual terminal conditions of the those antennas. This results in necessity of controlling the mutual terminal conditions of the antennas.

SUMMARY OF THE INVENTION

The present invention, which solves the above problem of the prior art, provides an antenna system in use with a small wireless machine which improves the receiving performance of a built-in antenna built in the wireless machine and realizes a quality and stable communication by controlling an impedance looking toward a radio circuit of the wireless machine from a feeding point of a whip antenna of the wireless machine.

To achieve the above object, a transmission line length adjusting circuit is provided between a whip antenna and a built-in antenna. With provision of the transmission line length adjusting circuit, a terminal impedance of the whip antenna may be controlled during the operation of the built-in antenna. Through the control of the terminal impedance of the whip antenna, a sensitivity of the built-in antenna is improved and a quality and stable communication is secured.

DETAILED DESCRIPTION OF THE PREFERRED EMBODIMENTS

Aspect 1 of the present invention defines an antenna system comprising: a whip antenna and a built-in antenna for diversity reception; an antenna select switch for selecting one of these antennas and connecting the selected one to a radio circuit; and a transmission line length adjusting circuit, inserted between the antenna select switch and the whip antenna, for controlling a terminal load condition of the whip antenna when the built-in antenna is connected to the radio circuit. When the built-in antenna is selected, the terminal impedance of the whip antenna can optimumly be controlled without having any affect on the impedance of the built-in antenna in the first frequency band.

Aspect 2 more specifically defines the antenna system defined in aspect 1 such that the antenna system further comprises a select switch for connecting a terminal circuit, which is for controlling an impedance of the whip antenna, to the antenna select switch when the built-in antenna is connected to a radio circuit. With the addition of the terminal circuit, an impedance at the feeding point of the whip antenna can optimumly controlled while minimizing passing losses of the transmission line length adjusting circuit connected to the whip antenna.

Embodiment 1

Figure 1:
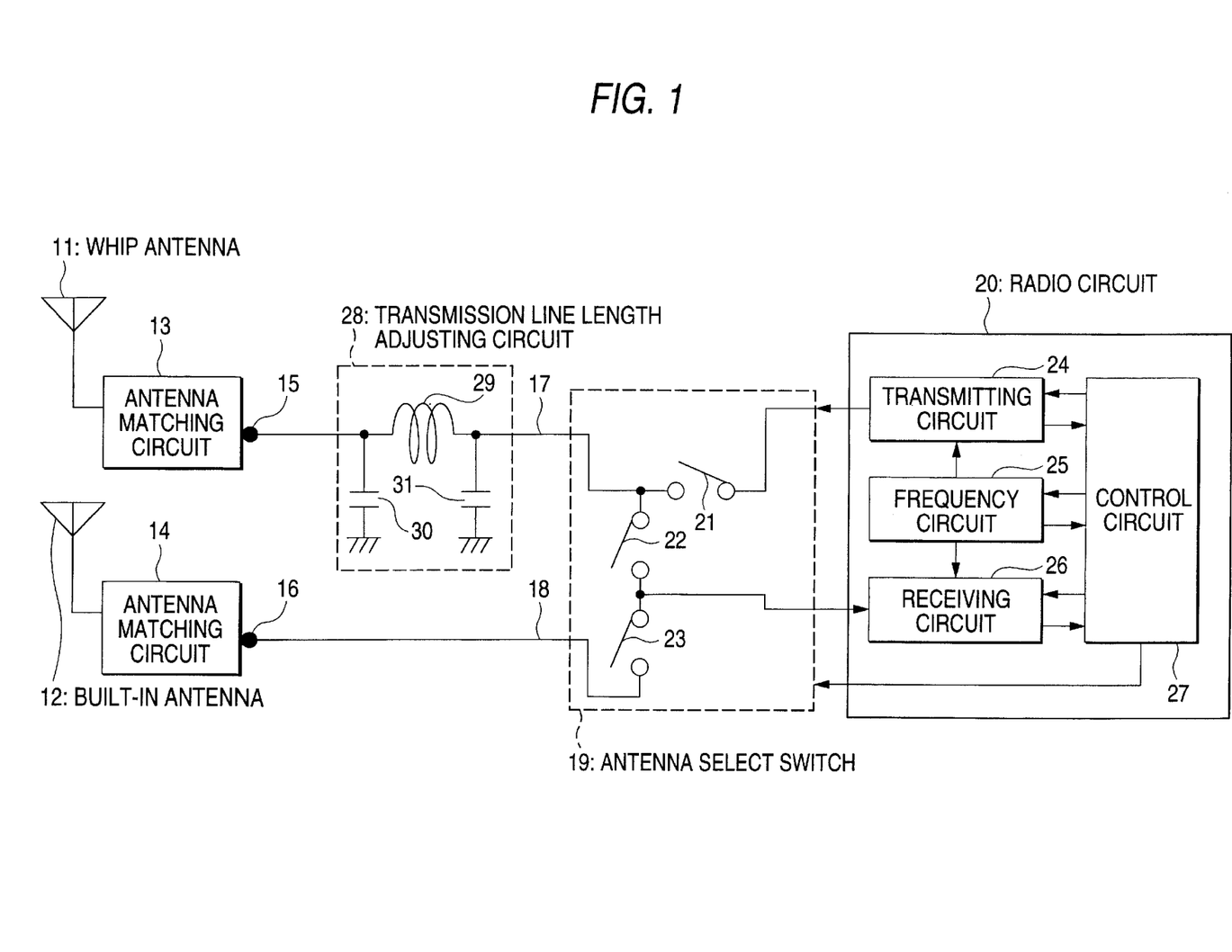
FIG. 1 is a block diagram showing an arrangement of an antenna system according to Embodiment 1 of the present invention.

The preferred embodiments of the present invention will be described with reference to the accompanying drawings. FIG. 1 shows an arrangement of an antenna system according to Embodiment 1 of the present invention, which will be defined in aspect 1. In the embodiment, the antenna system is applied to a small wireless machine. In FIG. 1, reference numeral 11 designates a whip antenna, and 12 a built-in antenna, and these antennas are connected to antenna matching circuits 13 and 14, respectively. Numerals 15 and 16 are points at which the feeders 17 and 18 are connected to the antenna matching circuits 13 and 14, respectively. Numeral 19 is an antenna select switch for selecting the whip antenna 11 or the built-in antenna 12 through the feeder 17 or 18 and connecting the selected one to a radio circuit 20. The antenna select switch 19 includes a first switch 21 connected between the feeder 17 and a transmitting circuit 24 in the radio circuit 20, a second switch 22 connected between the feeder 17 and a receiving circuit 26 in the radio circuit 20, and a third switch 23 connected between the feeder 18 and the receiving circuit 26 in the radio circuit 20. In the radio circuit 20, a frequency circuit 25 is connected to the transmitting circuit 24 and the receiving circuit 26. A control circuit 27 is connected to the transmitting circuit 24, the frequency circuit 25 and the receiving circuit 26. A transmission line length adjusting circuit 28 is inserted in the feeder 17, and includes a lumped inductor 29, and two lumped capacitors 31 and 30 connecting the ends of the inductor 29 to ground. The antenna matching circuit 14 associated with the built-in antenna 12 may be omitted.

The antenna matching circuit 13 has an impedance transforming characteristic for transforming an impedance of the whip antenna 11 into an impedance of the radio circuit 20 in a first frequency band at the node 15. The transmission line length adjusting circuit 28 is adjusted to have the impedance-of the radio circuit 20 in the first frequency band at both ends thereof, and arranged to be able to control an effective electric length in the first frequency band. The antenna select switch 19 selects the whip antenna 11 or the built-in antenna 12 to enable the wireless machine to perform a diversity reception, and further selects the transmitting circuit 24 or the receiving circuit 26 to put the whip antenna 11 to be in common use. For the transmission by the whip antenna 11, the first switch 21 is turned on, while the remaining switches are turned off. For the reception by the whip antenna 11, the second switch 22 is turned on while the remaining switches are turned off. For the reception by the built-in antenna 12, the third switch 23 is turned on while the remaining ones are turned off, and a connection of the whip antenna 11 side, or a signal route including the whip antenna 11, is open. At this time, the impedance looking into the radio circuit 20 from the node 15 contains a reactance component determined by the electrical distance of an extension of the internal signal lines of the transmission line length adjusting circuit 28, the feeder 17 and the antenna select switch 19.

In case where the built-in antenna and the whip antenna are closely disposed as in the handyphone, the coupling of them at high frequencies is large. The electrical performances of the built-in antenna greatly varies depending on the terminal condition of the whip antenna. To cope with this, the embodiment under discussion selects the best terminal condition of the whip antenna 11 for the built-in antenna 12.

Figure 2:
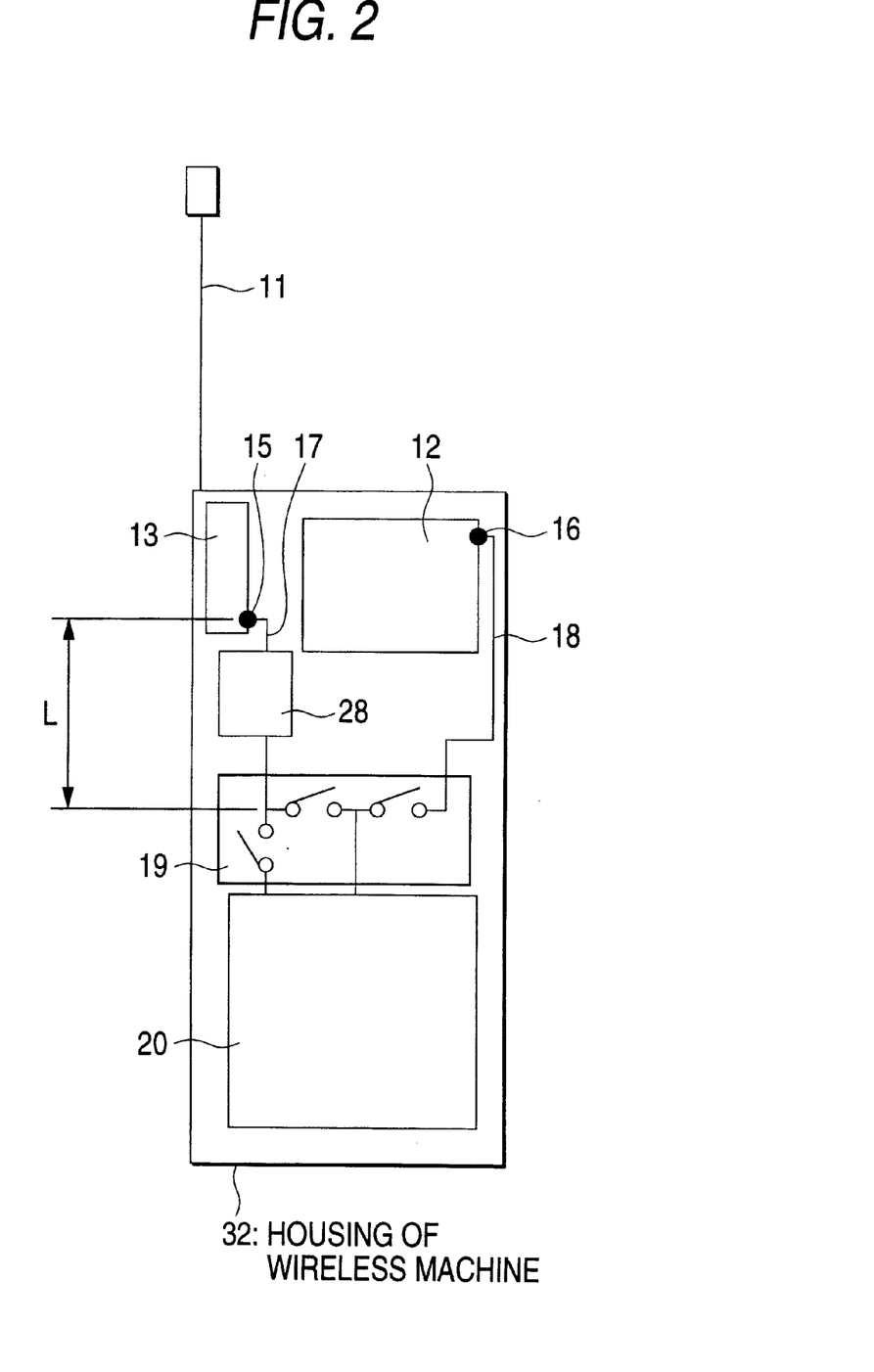
FIG. 2 is a diagram showing a parts-layout within the wireless machine into which the antenna system in Embodiment 1 is coupled.

FIG. 2 is a diagram showing a parts-layout within the wireless machine into which the antenna system of the embodiment under discussion is coupled. In the figure, like reference numerals are used for designating like or equivalent portions illustrated in FIG. 1. Numeral 32 indicates a housing 32 of the wireless machine, formed of a metal plate of 125 mm long and 35 wide. The whip antenna 11 consists of a metal wire of 0.8 mm in diameter and 80 mm in element length. The built-in antenna 12 is a reversed F antenna as a metal plate of 20 mm long, 25 mm wide and 5 mm deep, and having a thickness of 0.3 mm.

An operation of the antenna system thus arranged will be described. In the operation description to follow, the center frequency of the first frequency band is 818 MHz, and an impedance looking toward the radio circuit 20 from the node 15 of the antenna matching circuit 13 of the whip antenna 11 is Z1. In a state of the antenna select switch 19 when the built-in antenna 12 is used for reception, the whip antenna 11 side is, usually, not connected to the radio circuit 20. The end of the whip antenna 11 side is open in the antenna select switch 19. Therefore, the impedance Z1 looking toward the radio circuit 20 from the node 15 contains no resistive component but a reactance component. In this state, the impedance Z1 is expressed by the following equation, and from the equation it is seen that the impedance Z1 periodically varies with a distance L to the open end.

$$Z1 = -(j\ Zo)/(\tan \beta L)\ [\Omega]$$

where $Zo$ = characteristic impedance $[\Omega]$
$L$ = distance to the open end $[m]$
$\beta$ = phase constant $[rad/m]$ It is noted that in the transmission line length adjusting circuit 28 in the present embodiment, an electrical length $\beta L$ [rad] of the transmission line may be varied. This fact indicates that a reactance component of the impedance Z1 can be properly varied.

Figure 3:
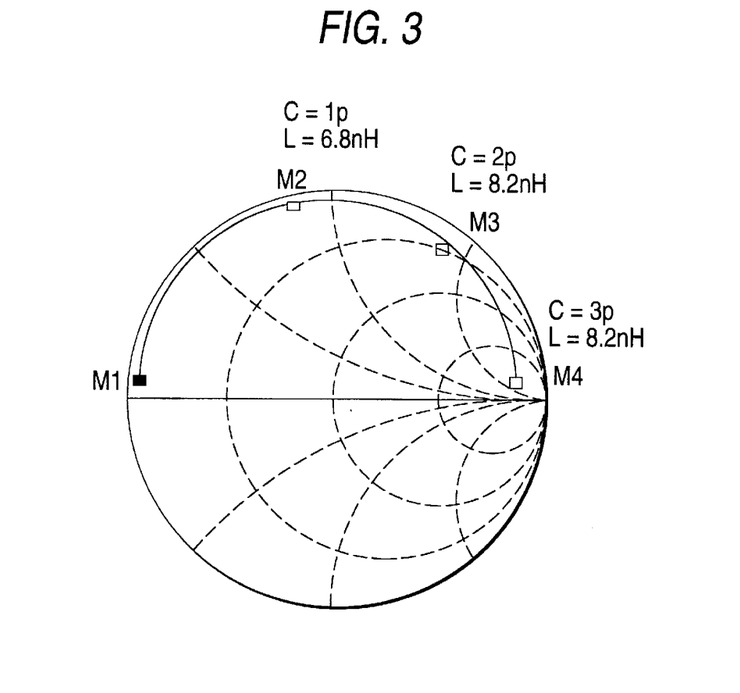
FIG. 3 shows the Smith chart on which different impedances of the transmission line length adjusting circuit in Embodiment 1 are plotted.

FIG. 3 shows the Smith chart with different impedances Z1 of the transmission line plotted thereon, which were measured by varying the electrical length of the transmission line in the first frequency band by the transmission line length adjusting circuit 28. The electrical length of the transmission line length adjusting circuit 28 was varied in the range of 0 to π/2 rad. Black an white square marks M1 to M4 indicate the impedances Z1 looking toward the radio circuit 20 from the node 15 when the center frequency of the first frequency band is 818 MHz. The black mark M1 indicates the impedance Z1 when the transmission line length adjusting circuit 28 is not used in the antenna system. In the impedance Z1 the reactance component thereof was nearly 0 in phase. The white square M2 indicates the impedance Z1 when the transmission line length adjusting circuit 28 was used. In the circuit, the inductor 29 was 6.8 nH, the capacitors 30 and 31 are each 1 pF in capacitance. The n electrical length is varied by approximately $\pi/4$ rad. The white square M3 indicates the impedance Z1 when the transmission line length adjusting circuit 28 was used in which the inductor 29 was 8.2 nH, the capacitors 30 and 31 are each 2 pF in capacitance. The electrical length is varied by approximately $\pi 3/8$ rad. The white square M4 indicates the impedance Z1 when the transmission line length adjusting circuit 28 was used in which the inductor 29 was 8.2 nH, the capacitors 30 and 31 are each 3 pF in capacitance. The electrical length is varied by approximately $\pi/2$ rad.

Thus, the impedance can be varied in a broad range by changing the electrical length of the transmission line length adjusting circuit 28.

Figure 4:
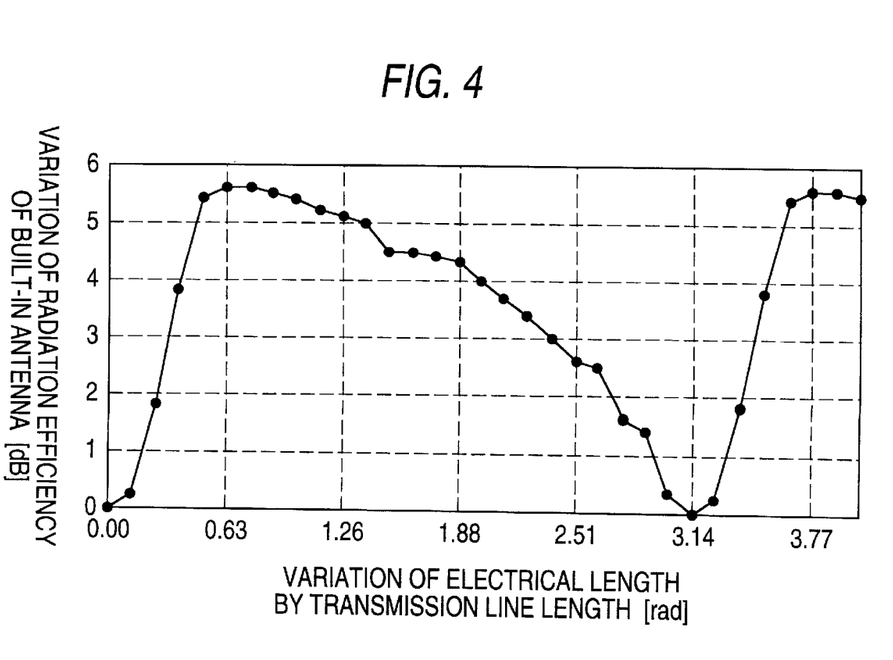
FIG. 4 shows a characteristic diagram showing a variation of a radiation efficiency of the antenna system in Embodiment 1.

FIG. 4 shows a characteristic diagram showing a variation of a radiation efficiency of the built-in antenna 12, which was measured by varying the electrical length in the first frequency band by the transmission line length adjusting circuit 28. In the measurement, the electrical length of the transmission line length adjusting circuit 28 were varied from 0 to $5\pi/4$ rad, including $\pi$rad, and the center frequency f1 of the first frequency band is 818 MHz. The radiation gain of the built-in antenna 12 is 0 dB when the transmission line length adjusting circuit 28 is not used. As seen from the graph, the improvement of a maximum of 5.6 dB is made in the radiation efficiency of the built-in antenna 12 when the electrical length of the transmission line length adjusting circuit 28 is varied. This value cancels a deterioration of the radiation efficiency of the antenna system, which is due to the coupling of the whip antenna 11 and the built-in antenna 12. One period of the radiation efficiency completes where the electrical length of the transmission line length adjusting circuit 28 is $\pi$grad. The radiation efficiency of the built-in antenna 12 periodically varies with a variation of the electrical length. Therefore, the electrical length can be adjusted to an optimal length by means of the transmission line length adjusting circuit 28 even if the electrical length takes any initial value because of an extension of the feeder 17 and the signal lines in the antenna select switch 19.

Figure 5A:
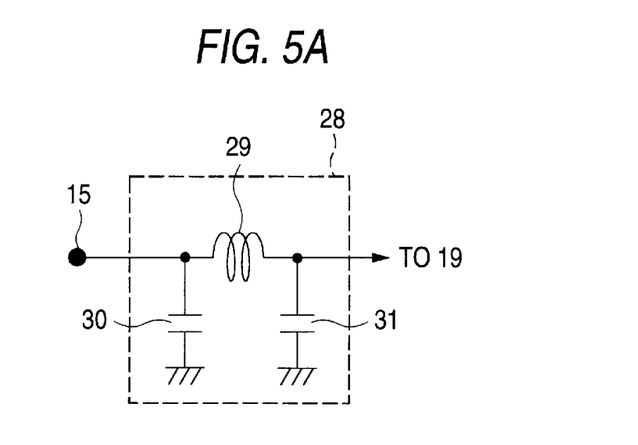
FIG. 5A is a circuit diagram of a specific example of the transmission line length adjusting circuit in Embodiment 1 of the invention.
Figure 5B:
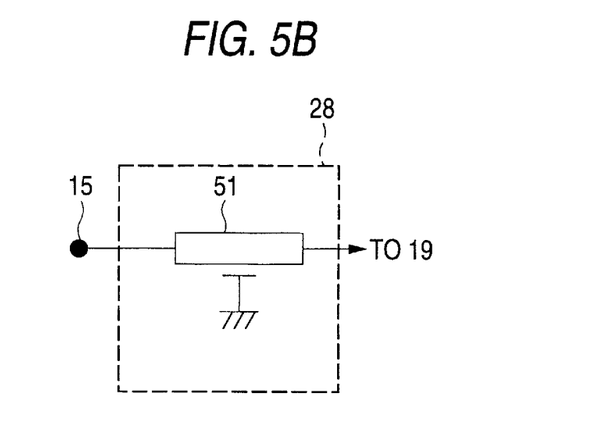
FIGS. 5B and 5C are diagrams schematically showing specific examples of the same.
Figure 5C:
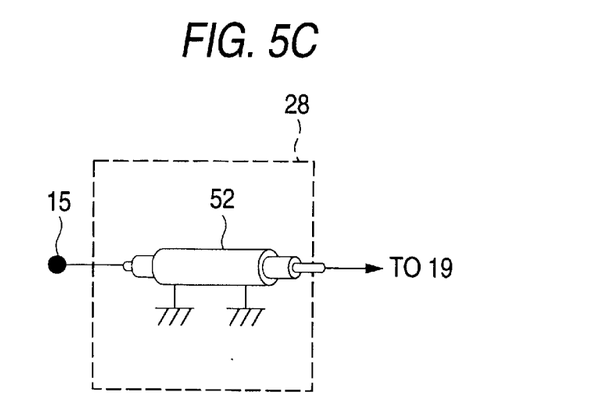

FIGS. 5A to 5C are diagram showing specific examples of the transmission line length adjusting circuit 28 in Embodiment 1 of the invention. FIG. 5A shows a transmission line length adjusting circuit which is the same as that 28 shown in FIG. 1. The circuit is made up of a lumped inductor 29, and two lumped capacitors 31 and 30. The impedances of the input and the output of the circuit may be set at a desired impedance by properly selecting the constants of the capacitors 30 and 31, and the inductor 29. Its effective electrical length can be adjusted by properly selecting the values of the inductor 29 and the capacitors 30 and 31. In an example shown in FIG. 5B, a transmission line length adjusting circuit 28 is constructed with a microstrip line 51. The impedances of the input and the output of the circuit may be set at a desired impedance by properly selecting the width of the microstrip line 51, a dielectric constant of a print board forming the microstrip line 51, and a distance to the ground surface. Its effective electrical length can be adjusted by properly selecting the length of the microstrip line 51. The microstrip line 51 shown in FIG. 5B is depicted as a linear pattern; however, it may take a shape of a meander line, a spiral line or the like. In an example shown in FIG. 5C, a transmission line length adjusting circuit 28 is constructed with a coaxial line 52. The impedances of the input and the output of the circuit may be set at a desired impedance by properly selecting the diameters of the inside and outside conductors of the coaxial line and a dielectric constant of the insulating resin thereof. Its effective electrical length can be adjusted by properly selecting the length of the coaxial line 52.

Embodiment 2

Figure 6:
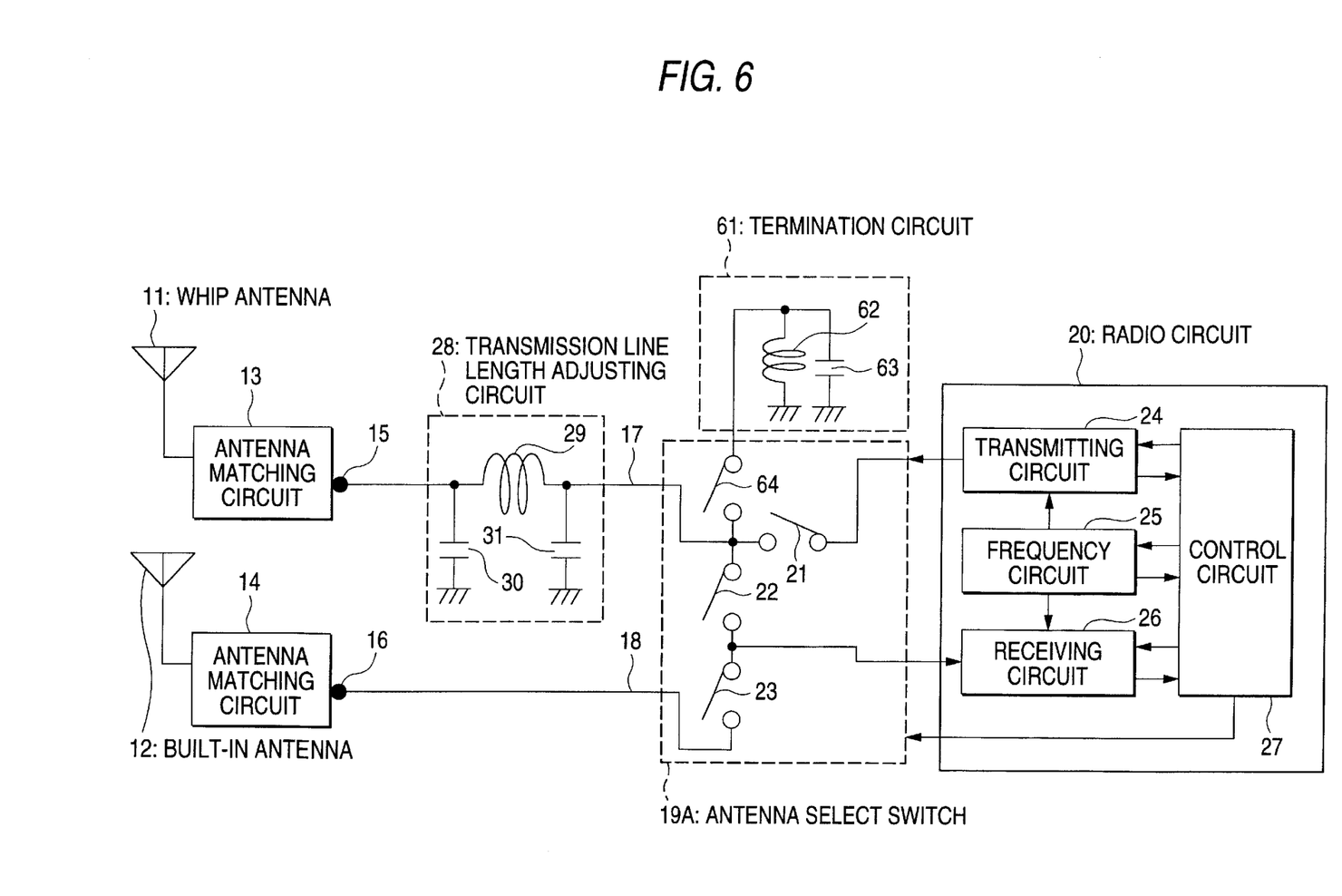
FIG. 6 is a circuit diagram showing an arrangement of an antenna system according to Embodiment 2 of the present invention.

FIG. 6 shows an arrangement of an antenna system according to Embodiment 2 of the present invention, which will be defined in aspect 2. In the embodiment, the antenna system is applied to a small wireless machine. In Embodiment 2, a termination circuit 61 is added to Embodiment 1 shown in Fig. 1. The termination circuit 61 is made up of an inductor 62 and a capacitor 63. The termination circuit 61 is connected to a part of a feeder 17, located in an antenna select switch 19A, by way of a fourth switch 64 therein. The remaining arrangement of Embodiment 2 is the same as of Embodiment 1. Hence, description of Embodiment 2 to follow will be given placing an emphasis on the different portions.

For the reception by the built-in antenna 12, the third switch 23 is turned on, the first and second switches 21 and 22 are turned off, and the fourth switch 64 is turned on. At this time, the impedance Z1 looking into the radio circuit 20 from the node 15 corresponds to an impedance determined by the electrical distance of an extension of the internal signal lines of the transmission line length adjusting circuit 28, the feeder 17 and the antenna select switch 19A. A radiation efficiency of the built-in antenna 12 depends largely on the terminal condition of the whip antenna 11 of the whip antenna 11. In the present embodiment, the best terminal condition of the whip antenna 11 for the built-in antenna 12 may be selected by controlling the transmission line length adjusting circuit 28 and the termination circuit 61. In selecting the best terminal condition for the built-in antenna 12, when the electrical length in the transmission line length adjusting circuit 28 sometimes is excessively large, a passing loss of the transmission line length adjusting circuit 28 is also increased correspondingly in the transmission line length adjusting-circuit 28. In this case, the radiation efficiency of the whip antenna 11 decreases. To cope with this, the present embodiment increases the electrical length of the termination circuit 61 and decreases the electrical length of the transmission line length adjusting circuit 28. By so doing, the embodiment under discussion minimizes the passing loss of the transmission line length adjusting circuit 28, whereby the radiation efficiency of the built-in antenna 12 is improved without decreasing the radiation efficiency of the whip antenna 11.

Figure 7A:
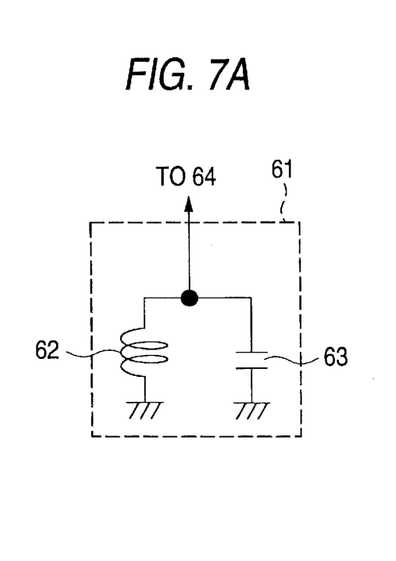
FIGS. 7A is a circuit diagram of a specific example of a termination circuit in Embodiment 1 of the invention.
Figure 7B:
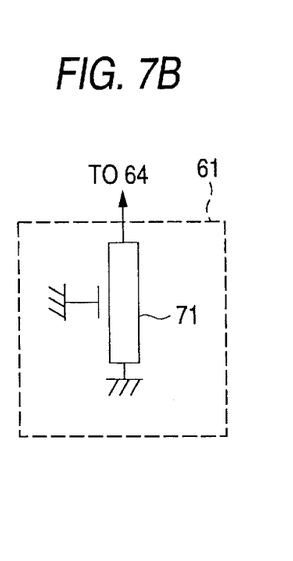
FIGS. 7B and 7C are diagrams schematically showing specific examples of the same.
Figure 7C:
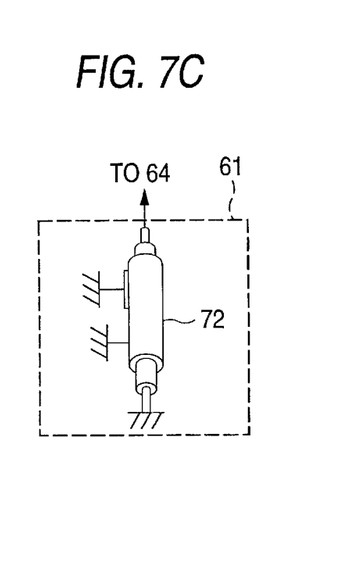

FIGS. 7A to 7C are diagrams showing specific examples of the termination circuit 61 in Embodiment 2 of the invention. FIG. 7A shows a termination circuit which is the same as that 61 shown in FIG. 6. The circuit is made up of a lumped inductor 62 and a lumped capacitor 63. The impedance looking into the termination circuit from the fourth switch 64 side may be set at a desired impedance by properly selecting the constants of the capacitor 63 and the inductor 62. Its effective electrical length can be adjusted by properly selecting the values of the inductor 62 and the capacitor 63. In an example shown in FIG. 7B, a termination circuit 61 is constructed with a microstrip line 71. The impedance looking into the termination circuit from the fourth switch 64 side may be set at a desired impedance by properly selecting the width of the microstrip line 71, a dielectric constant of a print board forming the microstrip line 71, and a distance to the ground surface. Its effective electrical length can be adjusted by properly selecting the length of the microstrip line 71. The microstrip line 71 shown in FIG. 7B is depicted as a linear pattern; however, it may take a shape of a meander line, a spiral line or the like. Also in FIG. 7B, the strip line 71 is open at the end, but may be open. In an example shown in FIG. 7C, a termination circuit 61 is constructed with a coaxial line 72. The impedance looking into the termination circuit from the fourth switch 64 side may be set at a desired impedance by properly selecting the diameters of the inside and outside conductors of the coaxial line and a dielectric constant of the insulating resin thereof. Its effective electrical length can be adjusted by properly selecting the length of the coaxial line 72. In FIG. 7C, the end of the coaxial line 72 is short-circuited but may be open.

As seen from the foregoing description, in the present invention, a transmission line length adjusting circuit is provided between a whip antenna and a built-in antenna. With provision of the transmission line length adjusting circuit, a terminal impedance of the whip antenna may be controlled during the operation of the built-in antenna. Through the control of the terminal impedance of the whip antenna, a sensitivity of the built-in antenna is improved and a quality and stable communication is secured.

What is claimed is:

1. An antenna system comprising:
    a whip antenna and a built-in antenna for diversity reception;
    an antenna select switch for selecting one of said antennas and connecting said selected one to a radio circuit; and
    a transmission line length adjusting circuit, inserted between said antenna select switch and said whip antenna, for controlling a terminal load condition of said whip antenna, when said built-in antenna is connected to said radio circuit.

2. The antenna system of claim 1, wherein said antenna select switch comprises a further select switch for connecting a termination circuit, which is for controlling an impedance of said whip antenna, to said antenna select switch, when said built-in antenna is connected to the radio circuit.

* * * * *

UNITED STATES PATENT AND TRADEMARK OFFICE
CERTIFICATE OF CORRECTION

PATENT NO.    : 5,940,040
DATED         : August 17, 1999
INVENTOR(S)   : Koyanagi et al.

It is certified that error appears in the above-identified patent and that said Letters Patent is hereby corrected as shown below:

Column 5, Line 36, delete "Tgrad" and insert --Trad--.

Signed and Sealed this

Twenty-eighth Day of December, 1999

Attest:

Attesting Officer

Q. TODD DICKINSON

Acting Commissioner of Patents and Trademarks